United States Patent
Ishibashi

(10) Patent No.: US 8,243,880 B2
(45) Date of Patent: Aug. 14, 2012

(54) SUBSTRATE MEASURING METHOD AND APPARATUS

(75) Inventor: Yasuhiko Ishibashi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 251 days.

(21) Appl. No.: 12/818,719

(22) Filed: Jun. 18, 2010

(65) Prior Publication Data

US 2011/0135062 A1    Jun. 9, 2011

(30) Foreign Application Priority Data

Dec. 7, 2009   (JP) .................................. 2009-277455

(51) Int. Cl.
*G01B 15/02* (2006.01)
(52) U.S. Cl. ............................................. 378/89; 378/86
(58) Field of Classification Search ............... 378/86–90
See application file for complete search history.

(56) References Cited

U.S. PATENT DOCUMENTS 7,483,513 B2 *   1/2009   Mazor et al. .................... 378/71
2002/0110218 A1 *   8/2002   Koppel et al. ................... 378/86
2005/0105686 A1 *   5/2005   Ito et al. ............................ 378/86
2005/0220267 A1 *   10/2005   Omote et al. .................... 378/89

FOREIGN PATENT DOCUMENTS

| JP | 5-36770 | 2/1993 |
| JP | 10-282022 | 10/1998 |
| JP | 2003-254920 | 9/2003 |
| JP | 2004-132956 | 4/2004 |
| JP | 2007-285923 | 11/2007 |
| JP | 2008-232677 | 10/2008 |

* cited by examiner

*Primary Examiner* — Hoon Song
(74) *Attorney, Agent, or Firm* — Finnegan, Henderson, Farabow, Garrett & Dunner, L.L.P.

(57) ABSTRACT

According to one embodiment of a substrate measuring method, a shape of a unit structure is measured by making an electromagnetic wave incident on a periodical structure and detecting a scattered electromagnetic wave. Measurement conditions are determined through calculation of a scattering profile representing the distribution of scattering intensities of the electromagnetic wave and optimization corresponding to a comparison result obtained by comparing the scattering profile every time a value of a parameter of attention is changed.

19 Claims, 10 Drawing Sheets

SCATTERING ANGLE (AZIMUTH)

SCATTERING ANGLE (ELEVATION)

SUBSTRATE MEASURING METHOD AND APPARATUS

CROSS-REFERENCE TO RELATED APPLICATIONS

This application is based upon and claims the benefit of priority from the prior Japanese Patent Application No. 2009-277455, filed on Dec. 7, 2009; the entire contents of all of which are incorporated herein by reference.

FIELD

Embodiments described herein relate generally to a substrate measuring method and a substrate measuring apparatus.

BACKGROUND

Microminiaturization of a circuit pattern of a semiconductor integrated circuit is advanced to attain improvement of performance. According to the microminiaturization of the circuit pattern, more strict accuracy is required for measurement of the circuit pattern. In a semiconductor process in the past, relatively rough dimensions such as width and height are targets of management concerning a unit structure included in a periodical structure. On the other hand, according to the advance of the microminiaturization of the circuit pattern, there is also a need for strictly measuring detailed dimensions of a shape such as roundness of an upper part of the unit structure called top rounding and roundness of a lower part of the unit structure called bottom rounding.

As technologies for precisely observing a sectional shape of a structure, for example, a scanning electron microscope (sectional SEM), a transmission electron microscope (TEM), an atomic force microscope (AFM), scatterometry, and critical dimension small angle X-ray scattering (CD-SAXS) are known. Among the technologies, the CD-SAXS for measuring a surface shape using X-ray small angle scattering is suitable for measurement of a micro circuit pattern from a viewpoint that satisfactory sensitivity with respect to a micro shape can be obtained in a non-destructive non-contact manner.

For example, Japanese Patent Application Laid-Open No. 2003-254920 proposes a technology of an X-ray analysis method and an X-ray analysis system for evaluating and correcting reliability of spectra of X rays. In such a technology, the reliability of the spectra is evaluated by dividing an integration time for accumulating X-ray intensity and monitoring a temporal change of peak intensity in the spectrum.

In the CD-SAXS, in general, an X-ray vessel is used as a light source. Usually, the X-ray vessel needs to irradiate light for a long integration time to obtain light intensity of a degree enough for measuring an intensity distribution of light scattered by a periodical structure. Therefore, a longer measurement time is required as higher accuracy is required for measurement. This causes deterioration in throughput in total of substrate measurement.

DETAILED DESCRIPTION

In general, according to one embodiment of a substrate measuring method, a parameter of attention is selected from shape parameters concerning a shape of a unit structure included in a periodical structure. Measurement conditions for measuring the shape of the unit structure are determined according to the parameter of attention. An electromagnetic wave is made incident while changing, according to the determined measurement conditions, an azimuth in a plane parallel to a reference plane on a substrate on which the periodical structure is formed. The electromagnetic wave is scattered in an azimuth direction parallel to the reference plane and an elevation direction perpendicular to the reference plane by reflection on the periodical structure and detected. The measurement conditions are determined through calculation of a scattering profile representing the distribution of scattering intensities of the electromagnetic wave due to the reflection on the periodical structure and optimization corresponding to a comparison result of comparison of the scattering profile performed every time a value of the parameter of attention is changed.

Exemplary embodiments of substrate measuring method and apparatus will be explained below in detail with reference to the accompanying drawings. The present invention is not limited to the following embodiments.

Figure 1A:
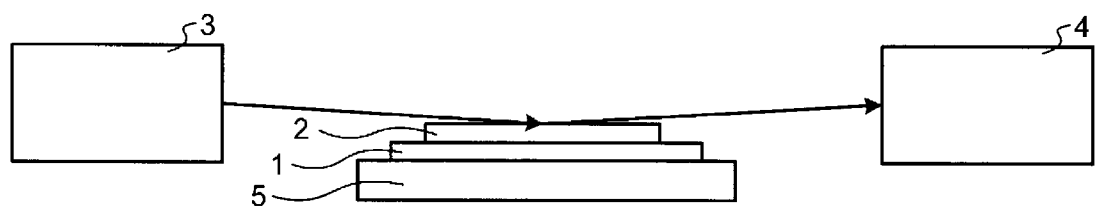
FIG. 1A is a schematic diagram of the side configuration of a substrate measuring apparatus to which a substrate measuring method according to a first embodiment is applied.
Figure 1B:
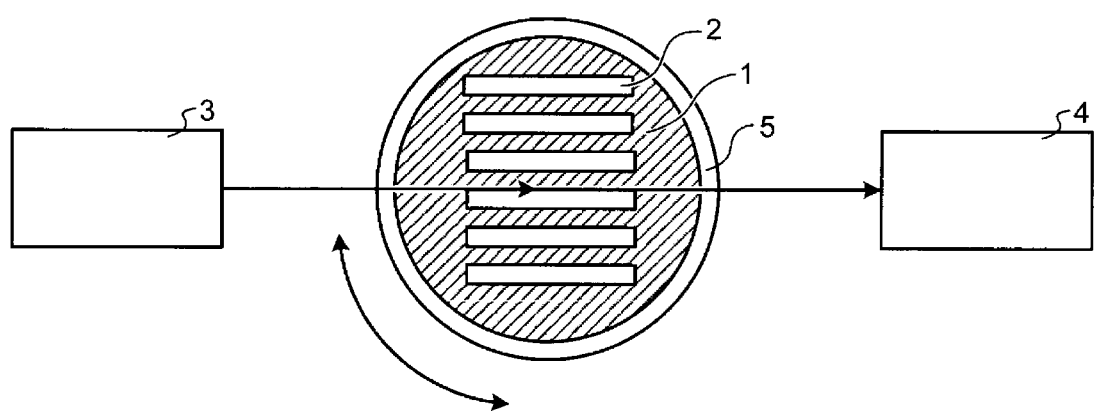
FIG. 1B is a schematic diagram of the plane configuration of the substrate measuring apparatus shown in FIG. 1A viewed from above.

FIG. 1A is a schematic diagram of the side configuration of a substrate measuring apparatus to which a substrate measuring method according to a first embodiment is applied. FIG. 1B is a schematic diagram of the plane configuration of the substrate measuring apparatus shown in FIG. 1A viewed from above. The substrate measuring method according to this embodiment adopts a method of reconstructing a pattern shape from an interference pattern by X rays scattered by a periodical structure on a substrate. The substrate measuring apparatus includes an optical system including an X-ray source 3 and a detector 4 and a stage 5 that rotates with a substrate as a sample placed thereon.

A semiconductor substrate 1 having a line pattern formed thereon is placed on the stage 5. The line pattern as a periodical structure includes a plurality of unit structures 2. Each of the unit structure 2 is formed in a line shape in a predetermined direction set as a longitudinal direction. A plane on which the line pattern is formed of the semiconductor substrate 1 is represented as reference plane. The stage 5 is configured to be rotatable in a plane parallel to the reference plane.

The X-ray source 3 emits X rays having, for example, wavelength of 0.05 nanometers to 0.5 nanometers. The X-ray source 3 functions as an electromagnetic-wave emitting unit that emits an electromagnetic wave for substrate measurement. The X-ray source 3 includes, for example, a rotation anode X-ray generator with copper (Cu) target that generates Cu Kα line and a concave mirror that focuses the generated X rays. The X-ray source 3 is arranged such that the X rays tilt at an angle equal to or smaller than 0.4 degree with respect to the reference plane.

Figure 2:
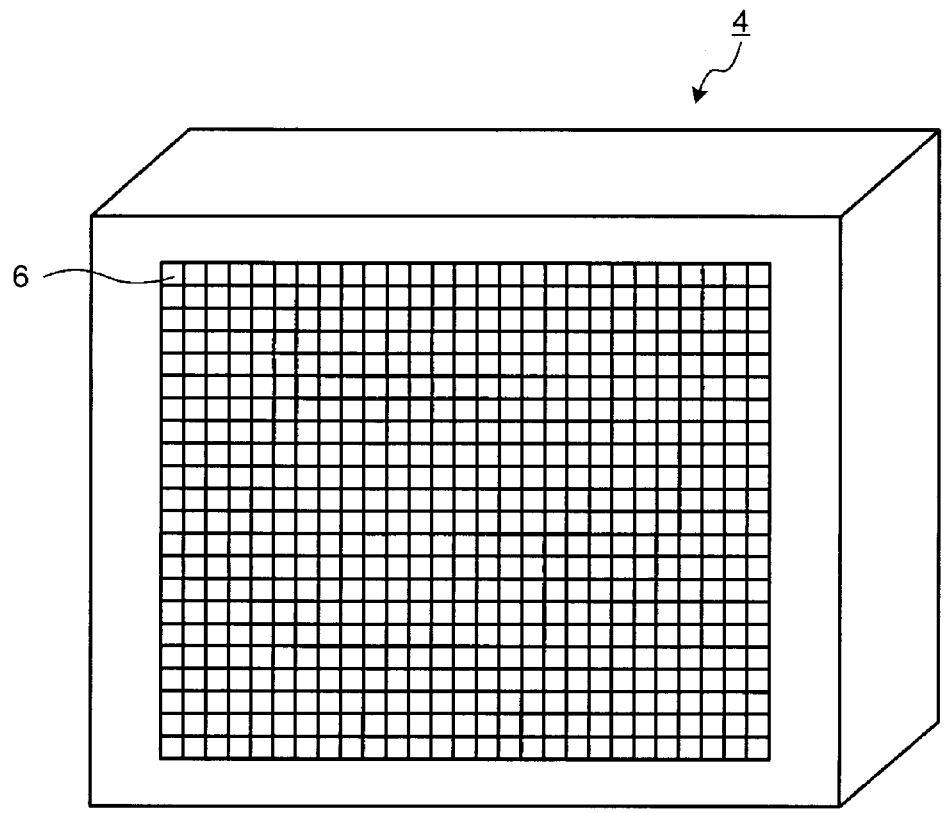
FIG. 2 is a diagram of the perspective schematic configuration of a detector.

FIG. 2 is a diagram of the perspective schematic configuration of the detector 4. The detector 4 includes a plurality of light receiving sections 6 arrayed in two-dimensional directions. The light receiving sections 6 function as detecting elements that detect X rays. The detector 4 detects an intensity distribution of the X rays in the two-dimensional directions. The detector 4 is arranged in a position sufficiently separated from the semiconductor substrate 1 on the stage 5 to make it possible to detect the X rays scattered wide from the line pattern.

Figure 3:
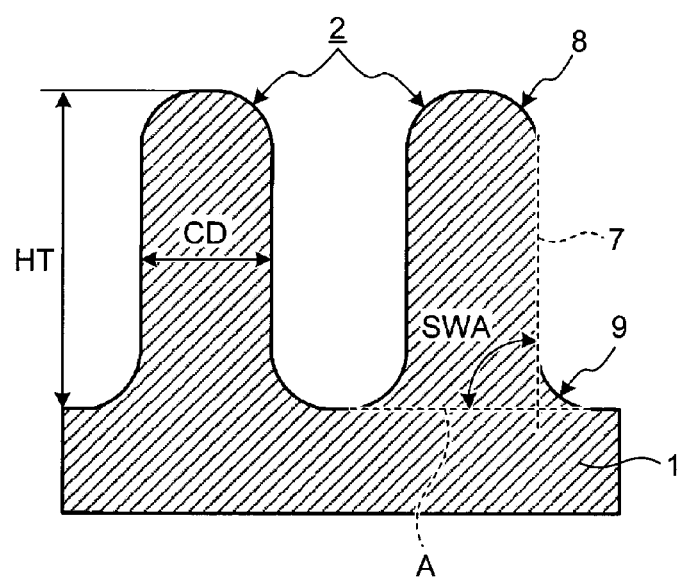
FIG. 3 is a sectional schematic diagram of a part of a semiconductor substrate and a line pattern.

FIG. 3 is a sectional schematic diagram of a part of the semiconductor substrate 1 and the line pattern. A section shown in the figure is a plane perpendicular to a longitudinal direction of the unit structure 2. In this embodiment, shape parameters concerning a shape of the unit structure 2 are measurement targets. The shape patterns include width (CD) in the section shown in the figure, height (HT) from a reference plane A to the top, a sidewall angle (SWA) formed by a sidewall section 7 and the reference plane A, and top rounding and bottom rounding.

The top rounding is a curvature or a curvature radius in a shoulder-like section 8 of the unit structure 2 on the opposite side of the reference plane A. The bottom rounding is a curvature or a curvature radius of a hem-like section 9 of the unit structure 2 on the reference plane A side. The sidewall section 7 is a wall-like section between the shoulder-like section 8 and the hem-like section 9.

X rays irradiated on the line pattern are scattered by reflection on the line pattern. An angle in a plane parallel to the reference plane A is represented as azimuth. An angle in a plane perpendicular to the reference plane A is represented as elevation. The X rays are made incident on the line pattern to form an azimuth close to a parallel with respect to the longitudinal direction of the unit structure 2 and an elevation of, for example, about 0.4 degree. The X rays scattered on the line pattern interfere with one another, whereby diffraction peaks appear in an azimuth direction (a direction parallel to the reference plane A) and an interference fringe appears at each of diffraction peaks in an elevation direction (a direction perpendicular to the reference plane A).

A scattering profile represents the distribution of scattering intensities of the X rays due to the reflection on the line pattern. A scattering profile including interference fringes can be calculated based on optical conditions and cross sectional shapes of line patterns. The optical conditions include wavelength, an incident azimuth, and an incident elevation of the X rays made incident on the line pattern and a scattering azimuth and a scattering elevation of the X rays scattered from the line pattern. Pattern conditions include a material and a sectional shape of the line pattern. The sectional shape is a contour shape of the section of the unit structure 2 and represented as a function of the shape parameters, i.e., the CD, the HT, the SWA, the top rounding, and the bottom rounding. The scattering profile of the X rays is calculated by subjecting the function representing the sectional shape to Fourier transform.

In CD-SAXS, a two-dimensional scattering profile is simulated from a sectional shape and the two-dimensional scattering profile is compared with a profile obtained by actual measurement, whereby the sectional shape is measured. Calculation of the two-dimensional scattering profile is explained. In this embodiment, the two-dimensional scattering profile is calculated by using a form factor calculated from a cross-section model.

Figure 4:
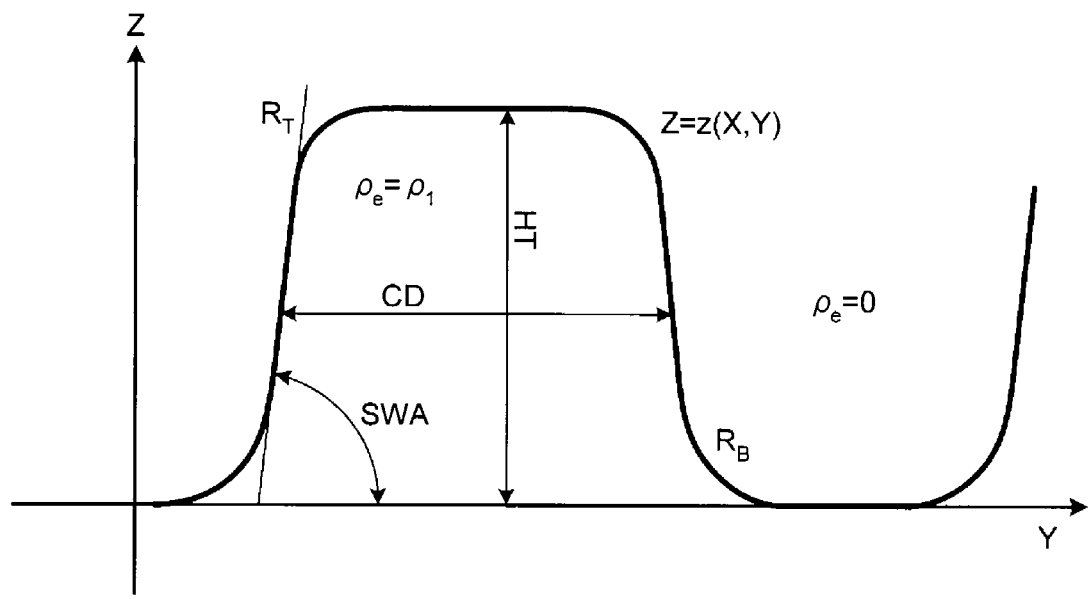
FIG. 4 is a diagram of a cross-section model of a line pattern.

FIG. 4 is a diagram of a cross-section model of the line pattern. A formula of the cross-section model ($Z = z(X, Y)$) is calculated based on CD, HT, SWA, a curvature radius ($R_T$) of top rounding, and a curvature radius ($R_B$) of bottom rounding. Subsequently, the formula Z of the cross-section model is substituted in the following formula to calculate a form factor F. The form factor F is calculated as indicated by the following formula by subjecting a place where electrons are present (electron density $\rho_e = \rho_1 \neq 0$) to space integration. Optical conditions (an incident angle α and an exit angle β) are substituted in a scattering vector ($Q = (Q_x, Q_y, Q_z)$).

$$F(\alpha, \beta, Q_{//}) = \int \rho_1 e^{-iQ_x \cdot X} e^{-iQ_y \cdot Y} e^{-Q_z \cdot Z} dX dY dZ$$

$$= \int \rho_1 \frac{e^{-ik_0(\sin\alpha + \sin\beta)z(X,Y)} - 1}{-ik_0(\sin\alpha + \sin\beta)} e^{-iQ_x \cdot X} e^{-iQ_y \cdot Y} dY$$

X-ray diffraction intensity is calculated based on the form factor F and a repetition period of the line pattern as indicated by the following formula:

$$I(\alpha, \beta, Q_{//}) = r_e^2 \left| \sum_j e^{-iQ \cdot R_j} F(\alpha, \beta, Q_{//}) \right|^2$$

$$= r_e^2 |F(\alpha, \beta, Q_{//})|^2 \sum_{j,k} e^{-iQ \cdot (R_j - R_k)}$$

$$= r_e^2 |F(\alpha, \beta, Q_{//})|^2 \frac{\sin^2\left(\frac{Q_y \cdot dN_Y}{2}\right)}{\sin^2\left(\frac{Q_y \cdot d}{2}\right)}$$

As an X-ray diffraction condition, the following relation is satisfied ("h" is an integer and "d" is a pitch of the line pattern):

$Q_y = 2\pi \, hd \; Q_x = 0$ $r_e = 2.818 \times 10^{-15}$ m (a classical electron radius).

A two-dimensional scattering profile is calculated by calculating the X-ray diffraction intensity for each exit angle β and each rotation angle θ of the substrate in this way.

When values of the shape parameters are changed, the intensity of the X-rays in the interference fringes and a period and a shape of the interference fringes change. Therefore, a difference occurs in the scattering profile. A way of appearance of the difference in the scattering profile has a specific characteristic in each of the shape parameters, the values of which are changed. When a plurality of scattering profiles having only a parameter of attention selected out of the shape parameters as a variable and having the other shape parameters as fixed values are compared, a diffraction profile area (e.g., an order of diffraction or a range of scattering angles) in which a change is observed in the scattering profile is deduced. In this embodiment, a diffraction profile area indicating high sensitivity in which a change tends to occur with respect to a change in a value of the parameter of attention in the scattering profile is extracted. Measurement conditions specific to the parameter of attention are determined.

Figure 5:
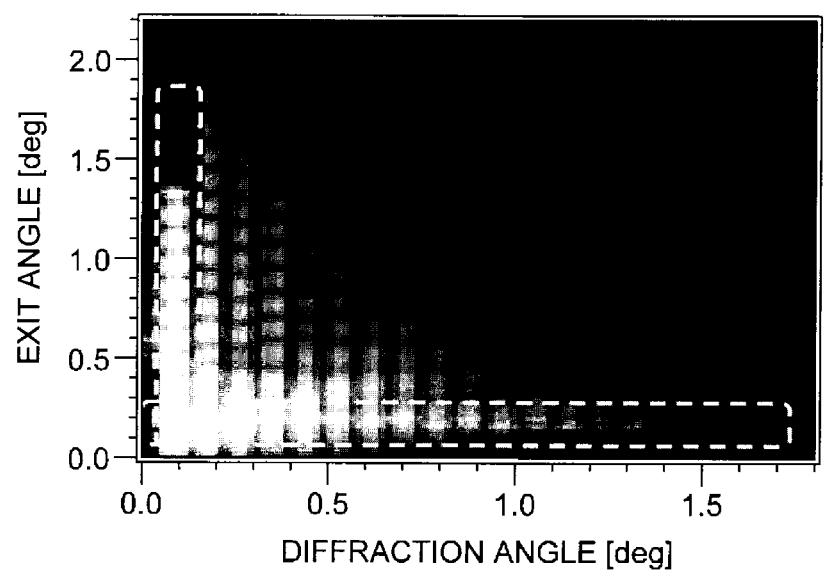
FIG. 5 is a diagram of an example of a two-dimensional scattering profile.
Figure 6:
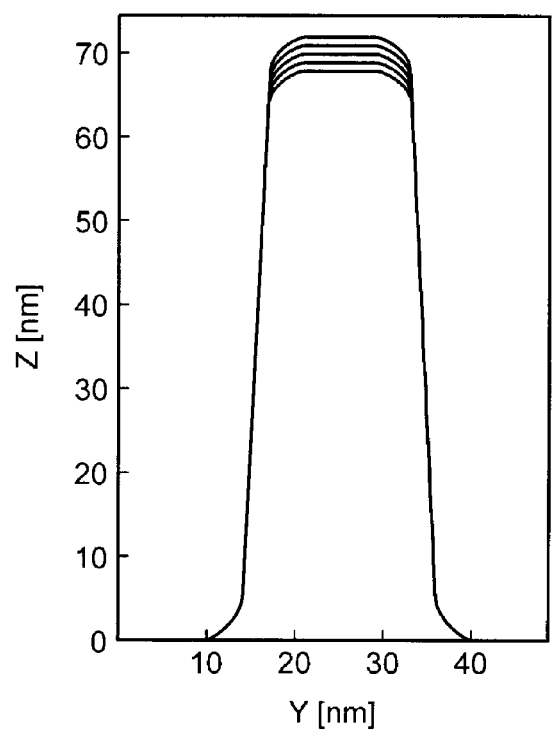
FIG. 6 is a diagram of a cross-section model obtained when HT is changed.
Figure 7:
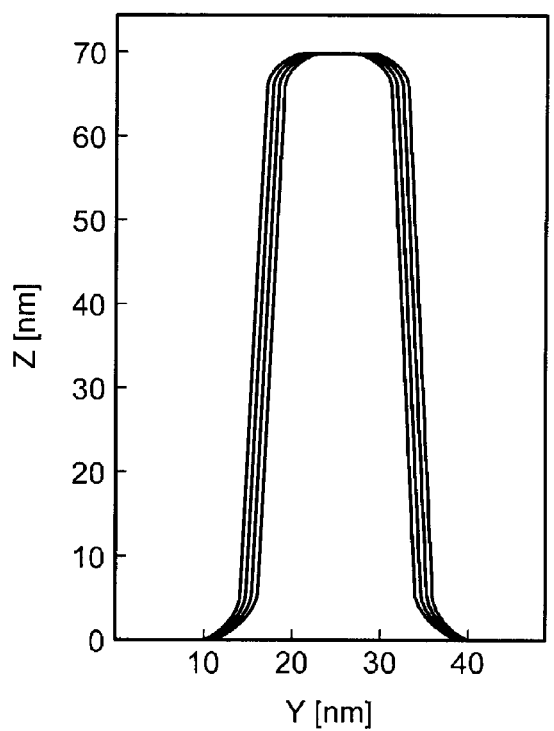
FIG. 7 is a diagram of a cross-section model obtained when CD is changed.

A difference in the scattering profile caused by a change in the shape parameters is explained below. FIG. 5 is a diagram of an example of a two-dimensional scattering profile. FIG. 6 is a diagram of a cross-section model obtained when the HT is changed. FIG. 7 is a diagram of a cross-section model obtained when the CD is changed. A change in the scattering profile that occurs when the HT is varied and a change in the scattering profile that occurs when the CD is varied are explained as examples. The scattering profile shown in FIG. 5 is represented with an exit angle (scattering angle (elevation)) plotted on the ordinate and a diffraction angle (scattering angle (azimuth)) plotted on the abscissa. In the scattering profile, as indicated by an area surrounded by a broken line, attention is paid to a scattering intensity distribution appearing in the longitudinal direction and a scattering intensity distribution appearing in the lateral direction.

Figure 8:
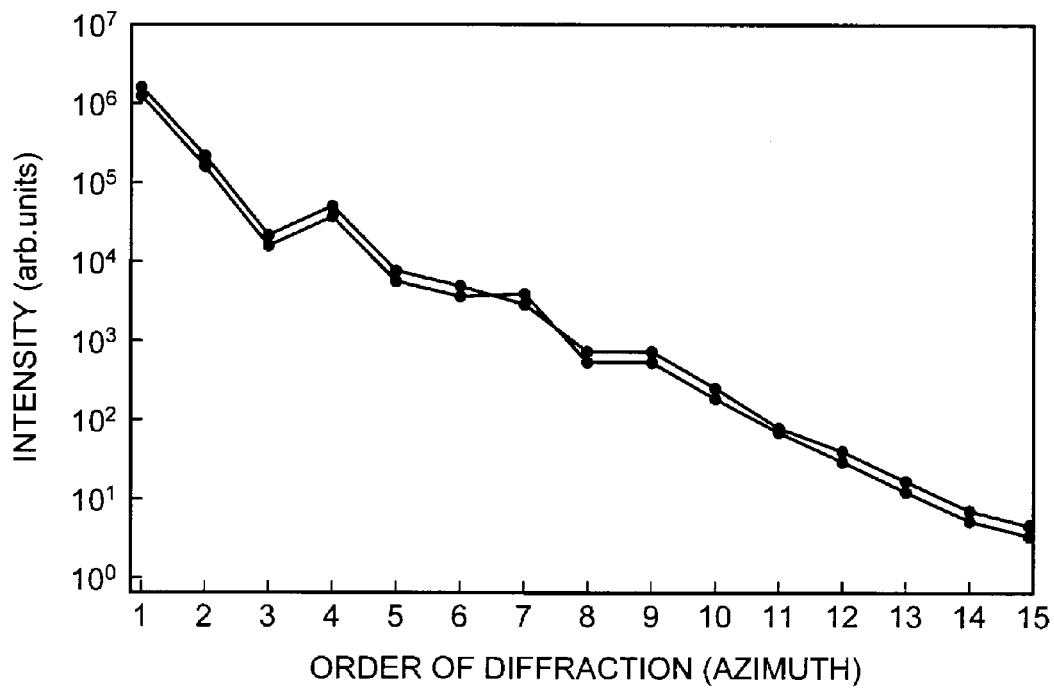
FIG. 8 is a graph of a scattering intensity distribution in a lateral direction simulated when the HT is changed by 1 nanometer at a time.
Figure 9:
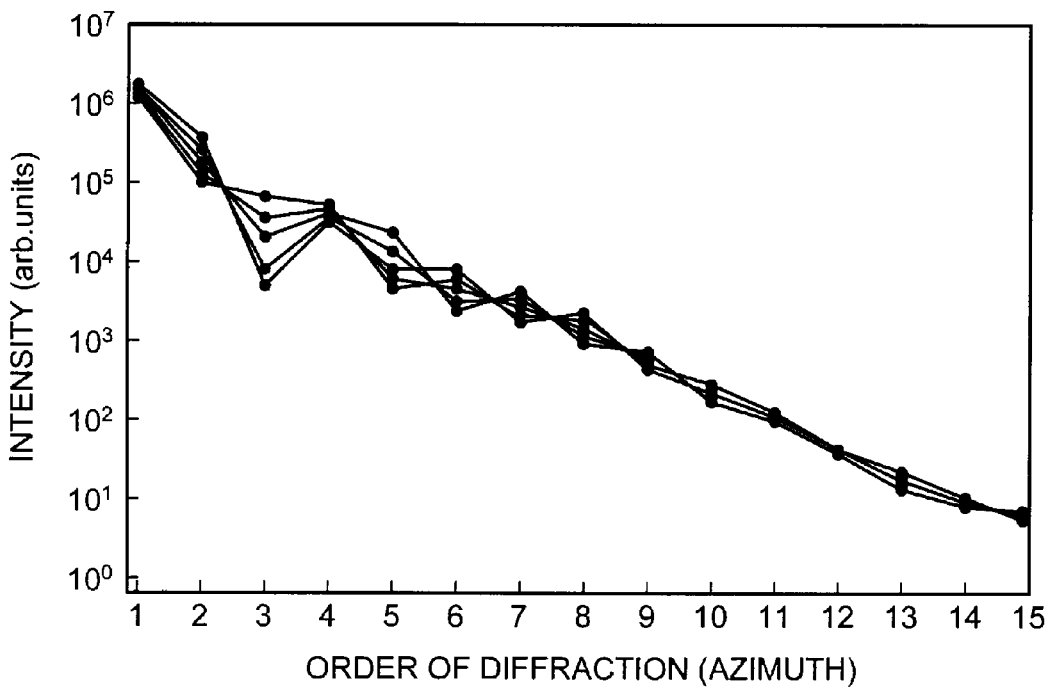
FIG. 9 is a graph of a scattering intensity distribution in the lateral direction simulated when the CD is changed by 1 nanometer at a time.
Figure 10:
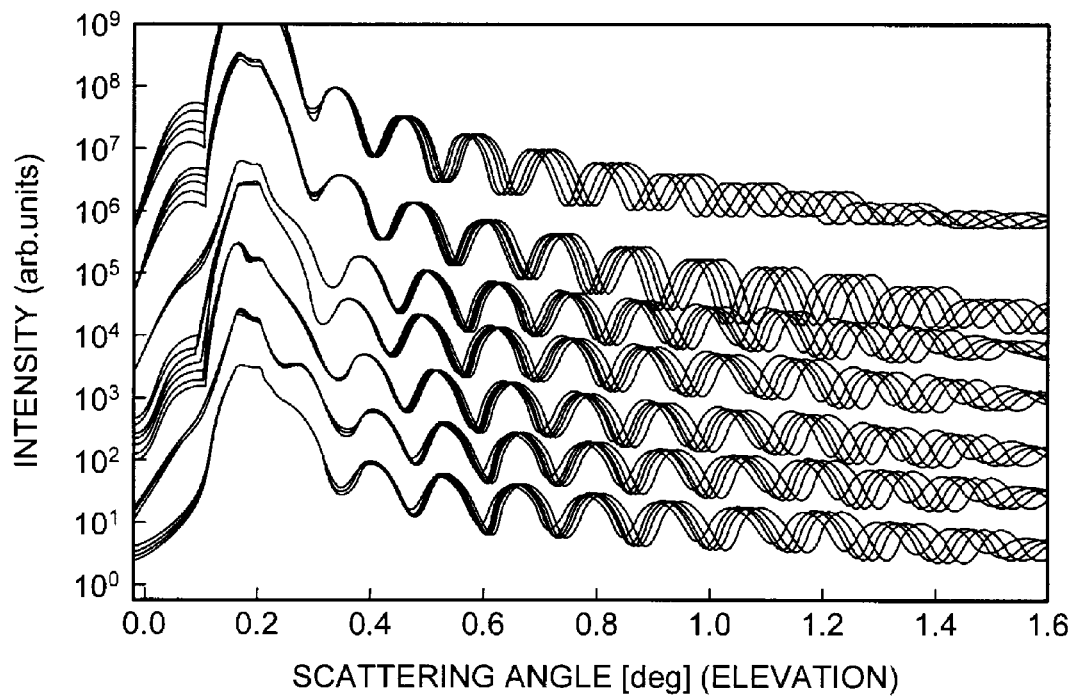
FIG. 10 is a graph of a scattering intensity distribution in a longitudinal direction simulated when the HT is changed by 1 nanometer at a time.
Figure 11:
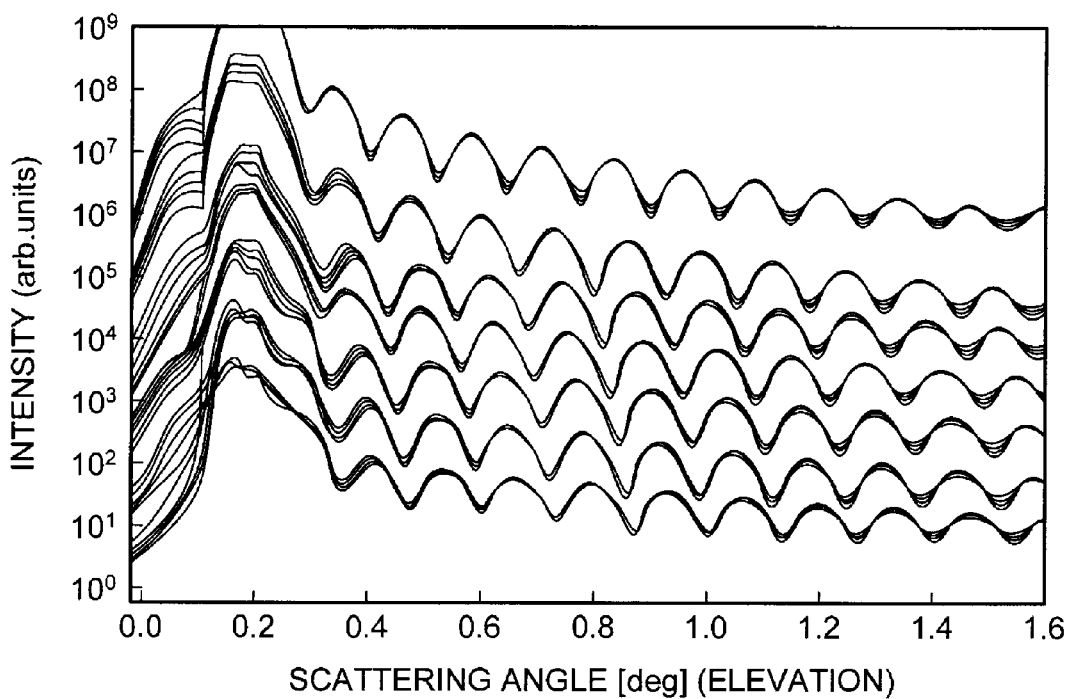
FIG. 11 is a graph of a scattering intensity distribution in the longitudinal direction simulated when the CD is changed by 1 nanometer at a time.

FIG. 8 is a graph of a scattering intensity distribution in the lateral direction simulated when the HT is changed by 1 nanometer at a time. FIG. 9 is a graph of a scattering intensity distribution in the lateral direction simulated when the CD is changed by 1 nanometer at a time. FIG. 10 is a graph of a scattering intensity distribution in the longitudinal direction simulated when the HT is changed by 1 nanometer at a time. FIG. 11 is a graph of a scattering intensity distribution in the longitudinal direction simulated when the CD is changed by 1 nanometer at a time.

When the graphs shown in FIGS. 8 to 11 are compared, with respect to the change in the HT, as shown in FIG. 10, a relatively large change is observed concerning orders of diffraction of the scattering profile in the longitudinal direction. With respect to the change in the CD, as shown in FIG. 9, a relatively large change is observed concerning, in particular, orders of diffraction 3 to 8 of the scattering profile in the lateral direction. A diffraction profile area in which a difference tends to occur in the scattering profile with respect to a change in the parameter of attention in this way, i.e., a diffraction profile area indicating high sensitivity is extracted. The diffraction profile area indicating high sensitivity is different for the HT and the CD. Similarly, concerning the other parameters, specific diffraction profile areas indicating high sensitivity are respectively extracted.

Figure 12:
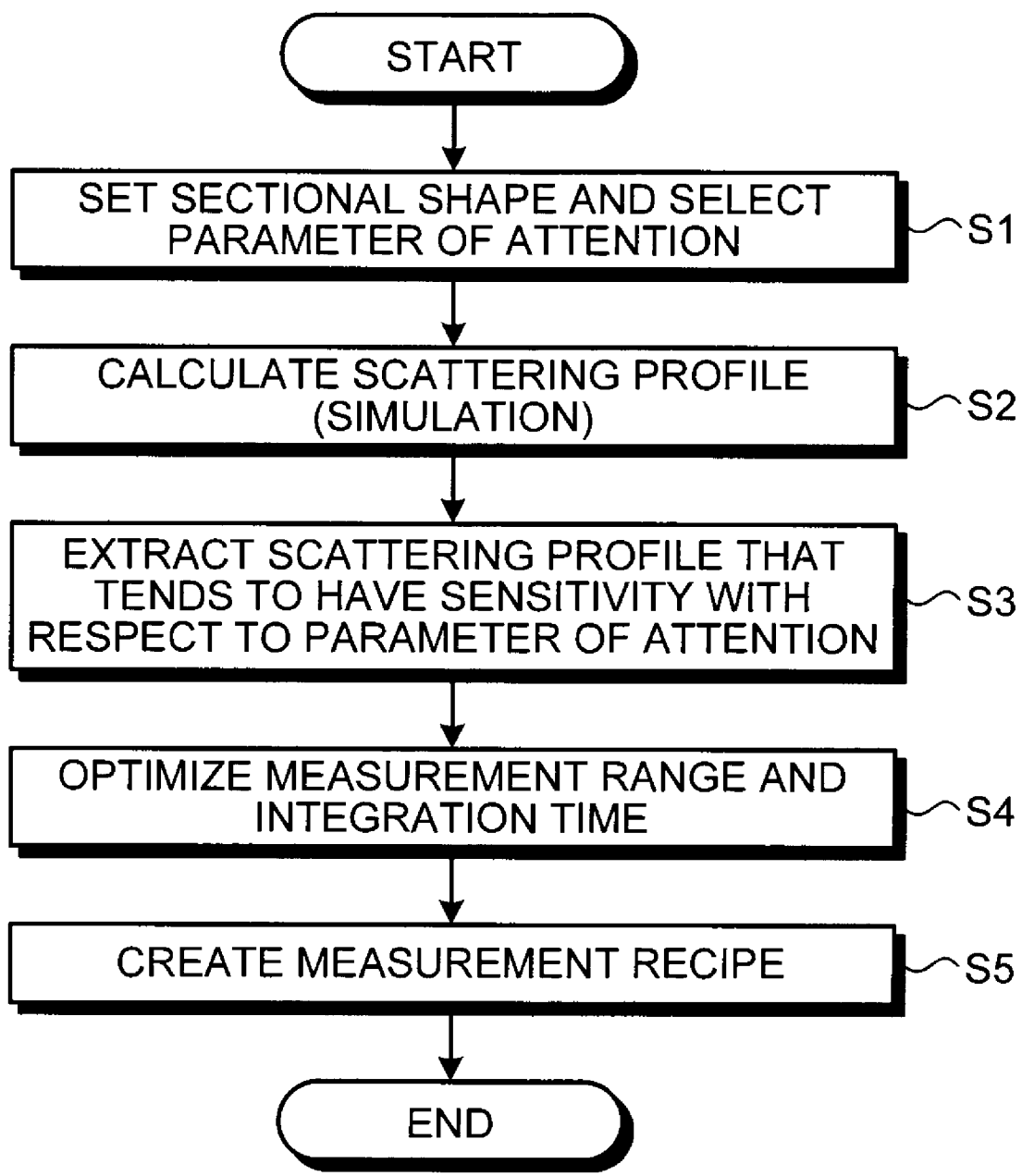
FIG. 12 is a flowchart for explaining a procedure for determining, according to a parameter of attention, measurement conditions for measuring a shape of a unit structure.

FIG. 12 is a flowchart for explaining a procedure for determining, according to a parameter of attention, measurement conditions for measuring a shape of the unit structure 2. At step S1, a sectional shape of the unit structure 2 as a target of simulation is set. In the setting of the sectional shape, one of the shape parameters, i.e., the CD, the HT, the SWA, the top rounding, and the bottom rounding, is selected as a parameter of attention. Fixed values are set for the other shape parameters. For the selected parameter of attention, a numerical value range and a numerical value interval are designated as variables. For example, when the bottom rounding is selected as the parameter of attention, a curvature radius or the like at an interval of 10 nanometers to 1 nanometer is designated.

At step S2, a scattering profile is calculated by simulation based on the setting at step S1 every time a value of the parameter of attention is changed. At step S3, scattering profiles calculated at step S2 are compared and a diffraction profile area that tends to have high sensitivity with respect to the parameter of attention is extracted. At step S4, optimization of a measurement range and an integration time as measurement conditions is performed according to a comparison result at step S3. At step S5, a measurement recipe reflecting the measurement range and the integration time optimized at step S4 is created.

For example, the top rounding or the bottom rounding is selected as the parameter of attention, a difference tends to appear in profile areas of a high order diffraction line and a high scattering angle. The high order diffraction line has small intensity. Therefore, a rather longer integration time is required to gain a signal to noise ratio (S/N). When the longitudinal direction of the unit structure 2 is set as an azimuth 0 degree, usual substrate measurement is carried out with a range from the azimuth 0 degree to an azimuth equal to or larger than 5 degrees, for example, about 10 degrees set as a measurement range. For example, weighting is performed to extend the integration time in the measurement range of the azimuth 0 degree to 5 degrees and reduce the integration time in the measurement range of the azimuth equal to or larger than 5 degrees. This makes it possible to reduce deterioration in the S/N and reduce the measurement time in the substrate measurement.

When the HT is selected as the parameter of attention, a difference tends to appear in a profile area of a first order diffraction line. Therefore, it is sufficient to measure only a low order diffraction line. Detected intensity is large in the low order diffraction line, in particular, the first order diffraction line. Therefore, it is possible to reduce the integration time and the measurement range. This makes it possible to obtain a satisfactory S/N and reduce the measurement time in the substrate measurement. To detect the low order diffraction line, an elevation of X rays made incident on the line pattern is adjusted to be equal to or smaller than, for example, 0.4 degree.

An integration time in which X rays are made incident is optimized by adjusting weighing with respect to a change in an azimuth at which the X rays are made incident on the line pattern. Concerning a diffraction profile area having high sensitivity to the parameter of attention, the deterioration in the S/N is reduced by weighting for extending the integration time. The integration time in a diffraction profile area having low sensitivity is reduced by performing the weighting of the integration time. A measurement range in the azimuth direction is optimized by appropriately adjusting an extracted diffraction profile area to obtain sufficient sensitivity. High-accuracy and high-throughput measurement can be performed concerning a shape parameter of attention in a micro periodical structure by adjusting the measurement range and the integration time according to necessary measurement sensitivity in this way.

Concerning the measurement range in the azimuth direction, for example, sufficient sensitivities can be respectively obtained at 0 degree to 3.5 degrees for the CD, at 0.1 degree to 0.25 degree for the height (or the depth), and at 0 degree to 2.5 degrees for the top rounding and the bottom rounding. Optimized measurement conditions are determined for each shape parameter of attention based on such a tendency.

Figure 13:
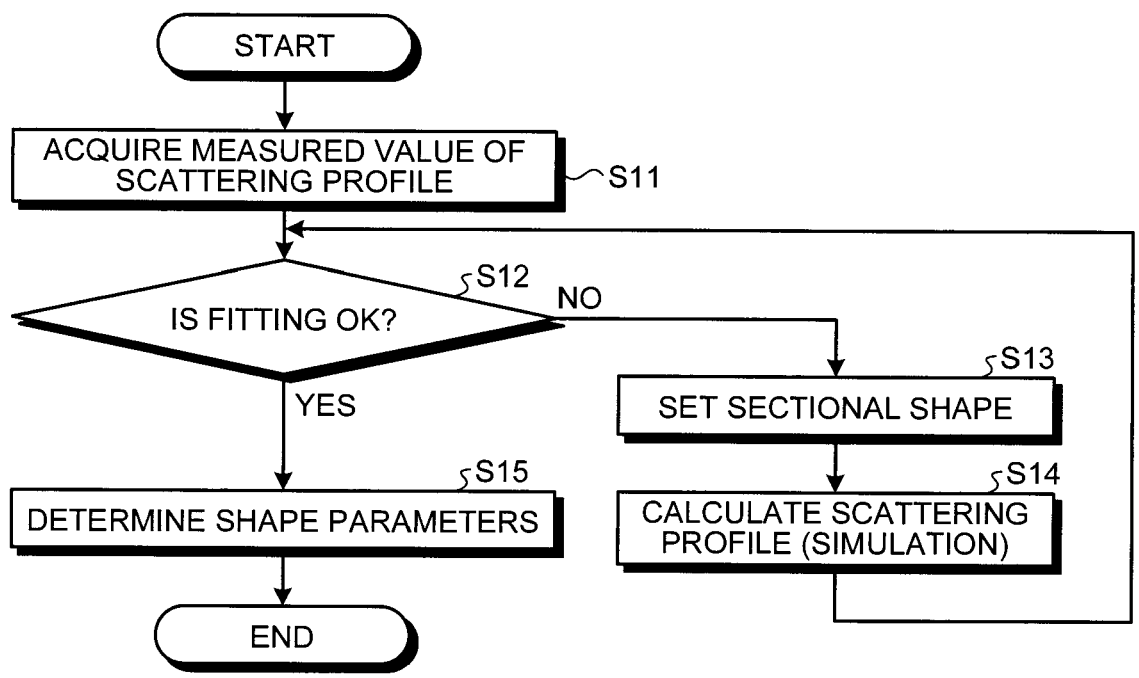
FIG. 13 is a flowchart for explaining a procedure of substrate measurement performed by using a measurement recipe created by the procedure shown in FIG. 12.

FIG. 13 is a flowchart for explaining a procedure of substrate measurement performed by using the measurement recipe created by the procedure shown in FIG. 12. At step S11, a measured value of a scattering profile concerning a semiconductor substrate 1 is acquired. An incident azimuth of X rays on the line pattern is changed by making the X rays incident on the line pattern while rotating the stage 5 on which the semiconductor substrate 1 is placed. It is possible to acquire scattering light under various diffraction conditions by changing the incident azimuth of the X rays on the line pattern. In the measurement recipe, an azimuth range and rotating speed for rotating the stage 5 are designated in association with each other.

The detector 4 detects the X rays reflected on the line pattern and scattered in the azimuth direction and the elevation direction. A two-dimensional scattering intensity image representing an intensity distribution of the X rays is created from a detection result of the X rays by the detector 4. Signal intensity by the X rays is integrated by causing the light receiving sections 6 of the detector 4 to continue exposure by the incident X rays. The two-dimensional scattering intensity image of the X rays is captured into a computer and converted into an intensity distribution per unit time every time the integration time changes based on the measurement recipe. A high-sensitivity two-dimensional scattering intensity image is obtained for a shape parameter of attention by adding up intensity distributions per unit time.

Figure 14:
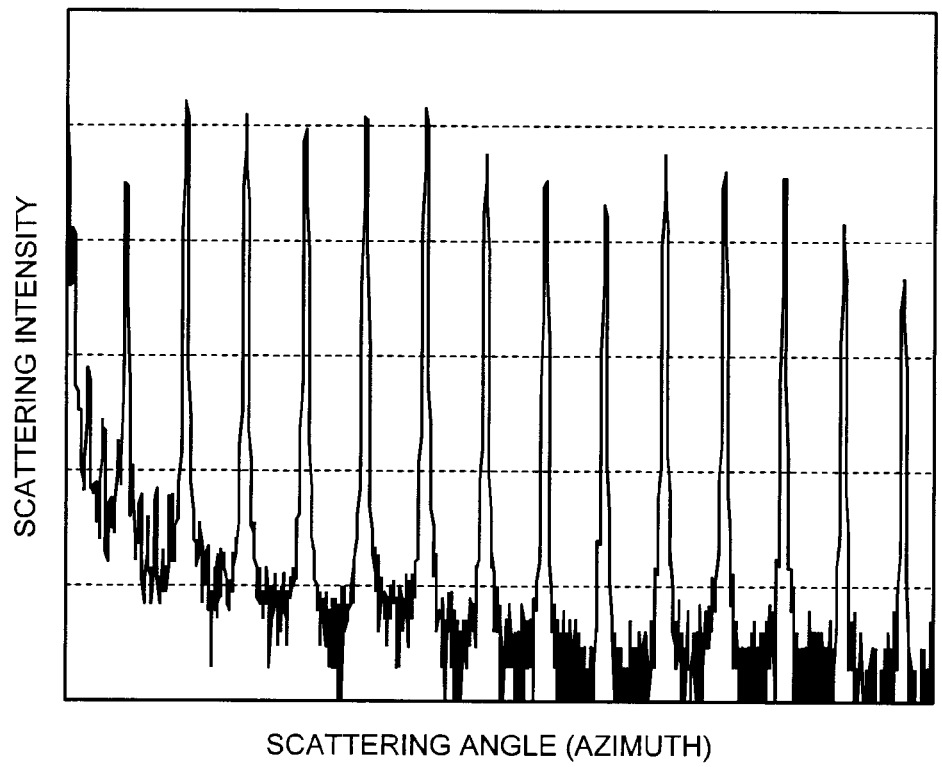
FIG. 14 is a diagram of an example of a scattering profile in an azimuth direction.
Figure 15:
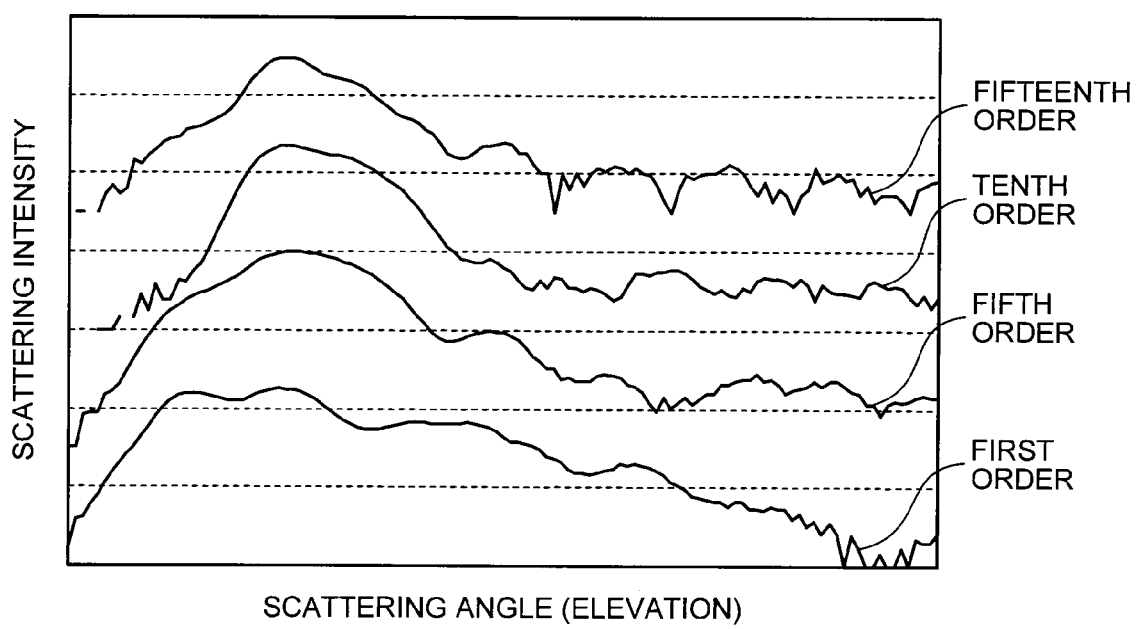
FIG. 15 is a diagram of an example of a scattering profile in an elevation direction.

The obtained two-dimensional scattering intensity image is divided in the azimuth direction and the elevation direction and calculated as scattering profiles concerning the respective directions. FIG. 14 is a diagram of an example of the scattering profile concerning the azimuth direction. The scattering profile concerning the azimuth direction represents the distribution of scattering intensities in a horizontal plane. Diffraction peaks reflecting pitch width of the line pattern appear. FIG. 15 is a diagram of an example of the scattering profile concerning the elevation direction. The scattering profile concerning the elevation direction represents scattering intensity in the vertical direction. Interference fringes reflecting the height of the line pattern appear. The scattering profile concerning the elevation direction is obtained for each of the diffraction peaks.

At step S12, fitting of the scattering profile obtained as the measured value at step S11 and the scattering profile obtained by the calculation is performed. Concerning the CD, fitting by the scattering profile in the azimuth direction is performed. Concerning the HT, the SWA, the top rounding, and the bottom rounding, fitting by the scattering profile in the elevation direction is performed. The fitting by the scattering profile in the azimuth direction and the fitting by the scattering profile in the elevation direction are alternately performed.

When the scattering profile obtained as the measured value and the scattering profile obtained by the calculation do not coincide with each other ("No" at step S12), at step S13, a sectional shape with values of the shape parameters changed is set. At step S14, a scattering profile is calculated by simulation concerning the sectional shape set at step S13. The fitting at step S12 is performed by using the scattering profile calculated by resetting the sectional shape.

When the scattering profile obtained as the measured value and the scattering profile obtained by the calculation coincide with each other ("Yes" at step S12), the shape parameters are optimized. Values of the optimized shape parameters are determined as measurement values (step S15). The measurement by the method according to this embodiment is completed. A scattering profile area that tends to have sensitivity with respect to a shape parameter of attention is deduced and rotating speed with respect to a measurement range in the azimuth direction is adjusted to secure the measurement time long in a measurement range in which sensitivity is high and reduce the measurement time in other ranges. This makes it possible to perform high-accuracy and high-throughput shape measurement specialized for the shape parameter of attention. Therefore, manufacturing yield for substrates can be improved by the highly-accurate shape measurement.

In this embodiment, the periodical structure of the sample is the line pattern. However, the present invention is not limited to this. The present invention can be applied to any pattern that has a periodical structure. The periodical structure can be, for example, a two-dimensional pattern, a hole pattern, and the like arrayed in the two-dimensional directions. The substrate measuring method according to this embodiment can be applied to a periodical structure of any pattern period. This embodiment is particularly useful for measurement of a micro periodical structure, for example, a periodical structure having a pattern period equal to or smaller than 30 nanometers. The electromagnetic wave used for the substrate measurement is not limited to the X rays and can be an electromagnetic wave having any wavelength as long as the electromagnetic wave causes a diffraction pattern through interference of scattered light.

Shape parameters are measurement targets are not limited to those explained in this embodiment. As the shape parameters, besides the CD, the HT, the SWA, the top rounding, and the bottom rounding, depth from the reference plane A, line edge roughness, line width roughness, height roughness, and the like can be adopted. These shape parameters can be used for a function of a sectional shape and can be selected as a parameter of interest.

In a second embodiment, an electromagnetic-wave emitting unit and a detector are displaced in the azimuth direction and the elevation direction. Components same as those in the first embodiment are denoted by the same reference numerals and signs and redundant explanation is omitted.

Figure 16A:
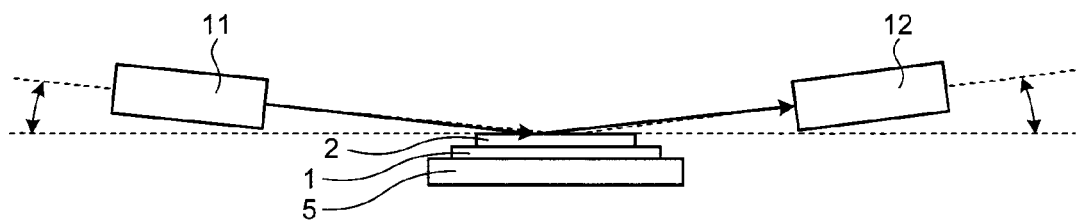
FIG. 16A is a schematic diagram of the side configuration of a substrate measuring apparatus to which a substrate measuring method according to a second embodiment is applied.
Figure 16B:
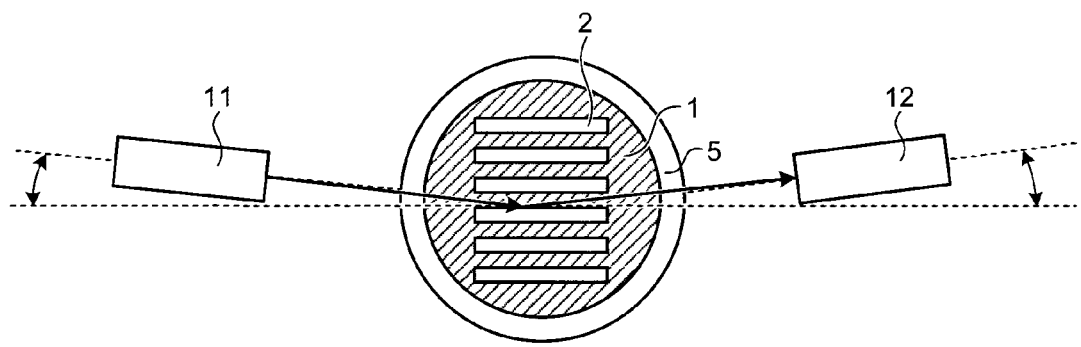
FIG. 16B is a schematic diagram of the plane configuration of the substrate measuring apparatus shown in FIG. 16A viewed from above.

FIG. 16A is a schematic diagram of the side configuration of a substrate measuring apparatus to which a substrate measuring method according to the second embodiment is applied. FIG. 16B is a schematic diagram of the plane configuration of the substrate measuring apparatus shown in FIG. 16A viewed from above. The substrate measuring apparatus includes a gonio-type optical system including an X-ray source 11 and a detector 12 and the stage on which a substrate as a sample is placed. Both of the X-ray source 11 and the detector 12 are configured to be displaceable in the azimuth direction and the elevation direction. The detector 12 includes a light receiving unit to detect X rays at one point. The stage 5 is not rotated in the azimuth direction and is fixed. The substrate measuring apparatus includes a mechanism for adjusting, based on measurement conditions, the position and the displacing speed of the X-ray source 11 and the detector 12.

The X-ray source 11 moves in the azimuth direction with reference to a position where X rays are parallel to the longitudinal direction of the unit structure 2 (an incident azimuth of the X rays is 0 degree). The X-ray source 11 and the detector 12 are relatively moved such that an incident azimuth and a scattering azimuth are diffraction angles determined according to a pattern pitch and an incident elevation and a scattering elevation are fixed. A scattering pattern in the azimuth direction is acquired by such measurement. A scattering pattern in the elevation direction is acquired by measurement with the incident elevation and the scattering elevation adjusted for each diffraction order. A measurement range in the azimuth direction and an integration time are optimized by simulation same as that in the first embodiment.

A scattering profile of the X rays is created by collating X-ray intensity detected by the detector 12 and an incident angle and a scattering angle of the X rays. A difference in the integration time due to an angle can be corrected by, for example, standardization corresponding to measurement conditions such that scattering profiles are continuously connected. In this embodiment, as in the first embodiment, it is possible to perform high-accuracy and high-throughput shape measurement specialized for the shape parameter of attention. In this embodiment, at least one of the electromagnetic-wave emitting unit and the detector only has to be displaced in at least one of the azimuth direction and the elevation direction. This embodiment can be modified as appropriate. For example, the detector 4 in which the detecting elements are arranged in parallel in the two-dimensional directions (see FIG. 2) can be used. In this case, only the X-ray light source 11 can be displaced in the azimuth direction and the elevation direction.

While certain embodiments have been described, these embodiments have been presented by way of example only, and are not intended to limit the scope of the inventions. Indeed, the novel methods and devices described herein may be embodied in a variety of other forms; furthermore, various omissions, substitutions and changes in the form of the methods and devices described herein may be made without departing from the sprit of the inventions. The accompanying claims and their equivalents are intended to cover such forms or modifications as would fall within the scope and spirit of the inventions.

What is claimed is:

1. A substrate measuring method comprising:
    selecting a parameter of attention from shape parameters concerning a shape of a unit structure included in a periodical structure;
    determining, according to the parameter of attention, measurement conditions for measuring the shape of the unit structure;
    making an electromagnetic wave incident on the periodical structure while changing, according to the determined measurement conditions, an azimuth in a plane parallel to a reference plane on a substrate on which the periodical structure is formed; and
    detecting the electromagnetic wave scattered in an azimuth direction as a direction parallel to the reference plane and an elevation direction as a direction perpendicular to the reference plane by reflection on the periodical structure, wherein
    the measurement conditions are determined through calculation of a scattering profile representing distribution of scattering intensities of the electromagnetic wave due to the reflection on the periodical structure and optimization corresponding to a comparison result obtained by comparing the scattering profile calculated every time a value of the parameter of attention is changed.

2. The substrate measuring method according to claim 1, wherein the measurement conditions are optimized by adjusting, with respect to a change in the azimuth at which the electromagnetic wave is made incident on the periodical structure, weighting of an integration time in which the electromagnetic wave is made incident.

3. The substrate measuring method according to claim 1, wherein the measurement conditions are optimized by adjusting a measurement range in the azimuth direction according to a scattering profile area extracted with respect to the parameter of attention.

4. The substrate measuring method according to claim 1, further comprising:
    acquiring a calculated value of the scattering profile by performing simulation concerning a set sectional shape;
    acquiring a measured value of the scattering profile by performing measurement according to the determined measurement conditions; and
    determining, as measurement values concerning the substrate, values of the shape parameters at the time when the scattering profiles as the measured value and the calculated value coincide with each other.

5. The substrate measuring method according to claim 1, further comprising selecting, as the parameter of attention, any one of width of the unit structure, height or depth from the reference plane of the unit structure, a sidewall angle formed by a sidewall section of the unit structure and the reference plane, bottom rounding on the reference plane side of the unit structure, and top rounding on an opposite side of the reference plane side.

6. The substrate measuring method according to claim 1, wherein a detector in which detection elements for detecting the electromagnetic wave are arrayed in two-dimensional directions is used for detection of the electromagnetic wave scattered by the periodical structure.

7. The substrate measuring method according to claim 6, further comprising creating, from a detection result of the detector, a two-dimensional scattering intensity image representing an intensity distribution of the electromagnetic wave and calculating, from the two-dimensional scattering intensity image, measured values of the scattering profile in the azimuth direction and the elevation direction.

8. The substrate measuring method according to claim 1, further comprising displacing, in at least one of the azimuth direction and the elevation direction, at least one of an electromagnetic-wave emitting unit that emits the electromagnetic wave and a detector that detects the electromagnetic wave.

9. The substrate measuring method according to claim 1, wherein the substrate is placed on a stage that can rotate in the azimuth direction.

10. A substrate measuring method comprising:
    setting, as a target of simulation, a sectional shape of a unit structure included in a periodical structure;
    selecting a parameter of attention from shape parameters concerning the sectional shape;
    calculating, by performing simulation, a scattering profile representing distribution of scattering intensities of an electromagnetic wave due to reflection on the periodical structure;
    extracting a diffraction profile area indicating a change specialized for the parameter of attention in the scattering profile calculated every time a value of the parameter of attention is changed;
    optimizing, according to the diffraction profile area, measurement conditions for measuring a shape of the unit structure;
    creating a measurement recipe reflecting the optimized measurement conditions; and
    optimizing the measurement conditions by adjusting, according to measurement sensitivity with respect to the extracted diffraction profile area, at least one of a measurement range in an azimuth direction as a direction parallel to a reference plane on a substrate on which the periodical structure is formed and an integration time in which the electromagnetic wave scattered by the reflection on the periodical structure is detected.

11. A substrate measuring apparatus comprising:
a stage on which a substrate having a periodical structure formed on a reference plane is placed;
an electromagnetic-wave emitting unit that emits an electromagnetic wave to the substrate on the stage; and
a detector that detects the electromagnetic wave scattered by the periodical structure, wherein
when a parameter of attention is selected from shape parameters concerning a shape of a unit structure included in the periodical structure and measurement conditions for measuring the shape of the unit structure is determined according to the parameter of attention,
the electromagnetic-wave emitting unit makes the electromagnetic wave incident on the periodical structure according to the determined measurement conditions while changing an azimuth in a plane parallel to the reference plane,
the detector detects the electromagnetic wave scattered in an azimuth direction as a direction parallel to the reference plane and an elevation direction as a direction perpendicular to the reference plane by the reflection on the periodical structure, and
the measurement conditions are determined through calculation of a scattering profile representing distribution of scattering intensities of the electromagnetic wave due to the reflection on the periodical structure and optimization corresponding to a comparison result obtained by comparing the scattering profile every time a value of the parameter of attention is changed.

12. The substrate measuring apparatus according to claim 11, the measurement conditions are optimized by adjusting, with respect to a change in the azimuth at which the electromagnetic wave is made incident on the periodical structure, weighting of an integration time in which the electromagnetic wave is made incident.

13. The substrate measuring apparatus according to claim 11, wherein the measurement conditions are optimized by adjusting a measurement range in the azimuth direction according to a scattering profile area extracted with respect to the parameter of attention.

14. The substrate measuring apparatus according to claim 11, wherein
a calculated value of the scattering profile is acquired by simulation concerning a set sectional shape;
a measured value of the scattering profile is acquired by measurement according to the determined measurement conditions; and
values of the shape parameters at the time when the scattering profiles as the measured value and the calculated value coincide with each other are determined as measurement values concerning the substrate.

15. The substrate measuring apparatus according to claim 11, wherein any one of width of the unit structure, height or depth from the reference plane of the unit structure, a sidewall angle formed by a sidewall section of the unit structure and the reference plane, bottom rounding on the reference plane side of the unit structure, and top rounding on an opposite side of the reference plane side is selected as the parameter of attention.

16. The substrate measuring apparatus according to claim 11, wherein
a detector has detection elements for detecting the electromagnetic wave, and
the detection elements are provided to be arrayed in two-dimensional directions.

17. The substrate measuring apparatus according to claim 16, wherein a two-dimensional scattering intensity image representing an intensity distribution of the electromagnetic wave is created from a detection result of the detector and measured values of the scattering profile in the azimuth direction and the elevation direction are calculated from the two-dimensional scattering intensity image.

18. The substrate measuring apparatus according to claim 11, wherein at least one of the electromagnetic-wave emitting unit and the detector can be displaced in at least one of the azimuth direction and the elevation direction.

19. The substrate measuring apparatus according to claim 11, wherein the stage can rotate in the azimuth direction.

* * * * *